March 28, 1933.  L. M. WOOLSON  1,903,080
INTERNAL COMBUSTION ENGINE
Filed Dec. 19, 1928  2 Sheets-Sheet 1
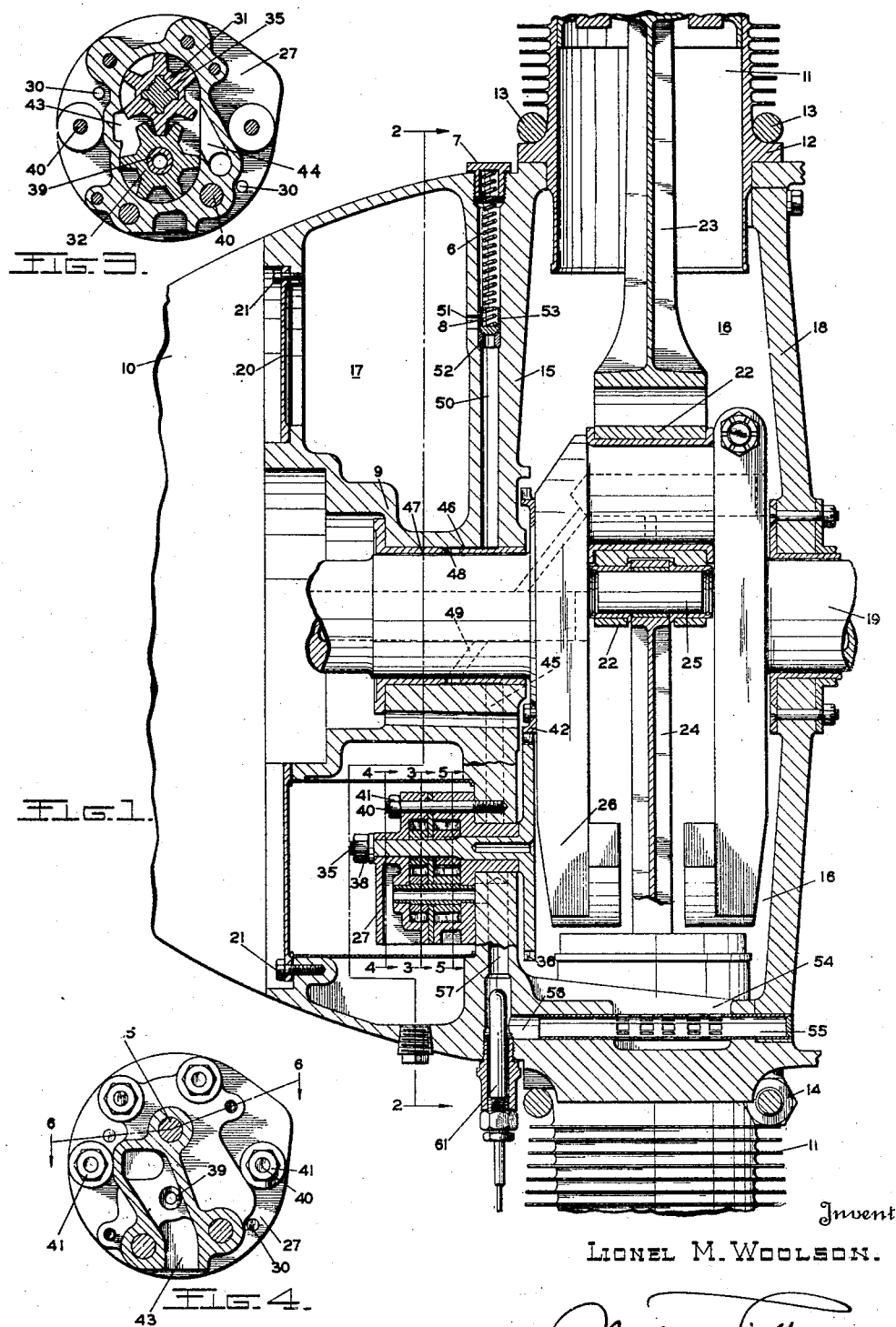
Inventor
LIONEL M. WOOLSON.
By Miller Sittets
Attorney March 28, 1933.   L. M. WOOLSON   1,903,080
INTERNAL COMBUSTION ENGINE
Filed Dec. 19, 1928   2 Sheets-Sheet 2
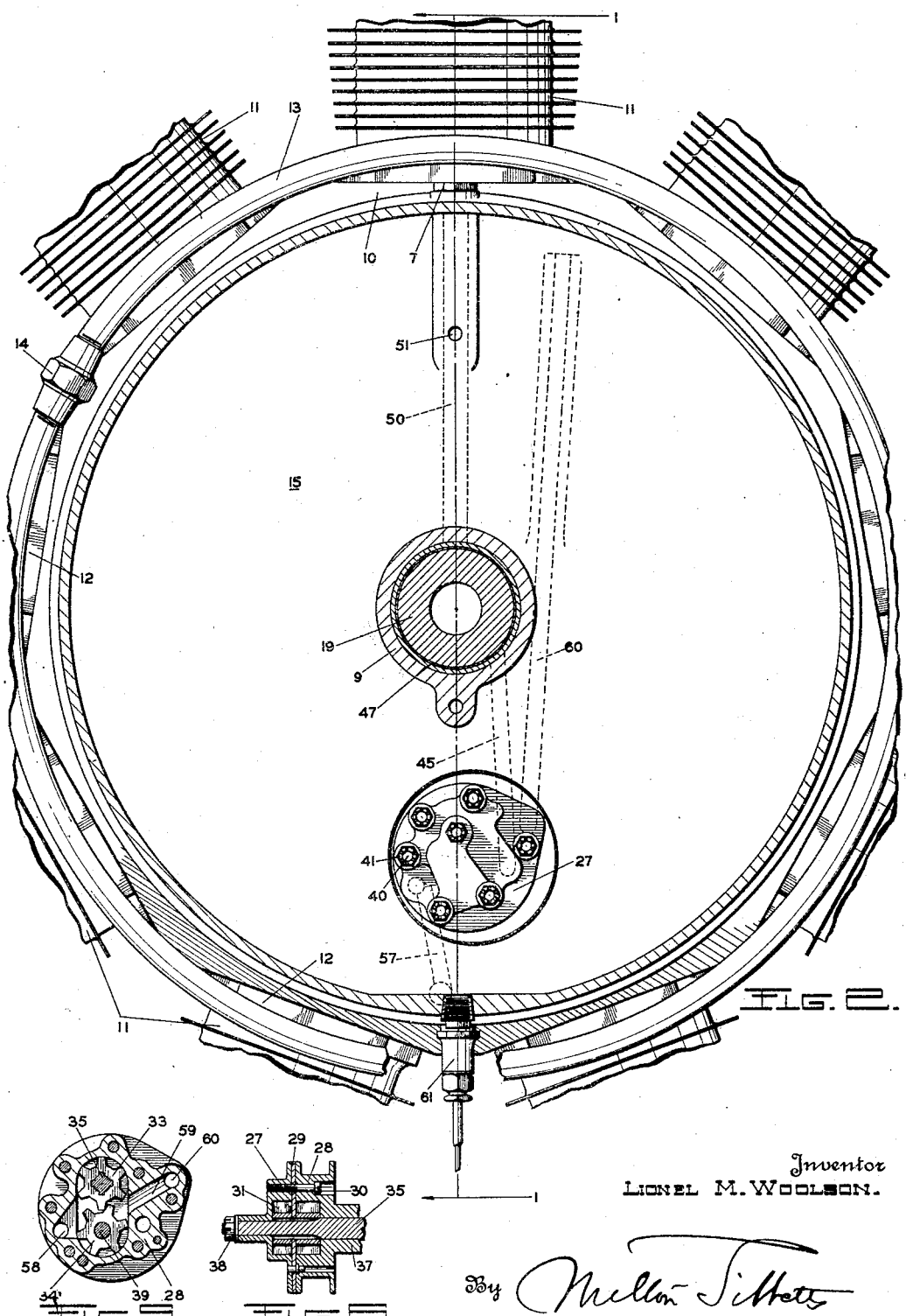
Inventor
LIONEL M. WOOLSON.
By Milton Tibbetts
Attorney Patented Mar. 28, 1933

1,903,080

UNITED STATES PATENT OFFICE

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN

INTERNAL COMBUSTION ENGINE

Application filed December 19, 1928. Serial No. 326,917.

This invention relates to engines and more particularly to internal combustion engines.

Lubrication trouble is one of the most general and serious difficulties encountered with engines, and more especially aircraft engines, and the cause can be chiefly attributed to the remote location of the lubricant reservoir and impelling means relative to the crank case, which arrangement necessitates pipes and fittings extending exteriorly of the casing. Vibration, among other reasons, will cause pipes, and fittings to become loose and disconnected, which conditions result respectively in lubricant leakage and failure of lubricant circulation. In addition, such pipes are exposed to temperature conditions which necessitates the heating of the lubricant in cold temperatures, prior to starting of the engine in order to lower the viscosity so that circulation is unrestricted. It is an object of this invention to provide an engine in which the enumerated lubrication difficulties are eliminated.

A further object of the invention is to provide an engine in which the lubrication circuit is established without the use of separate pipes and fittings.

Another object of my invention is to provide an engine in which the entire lubricating system is wholly contained within the crank casing.

A still further object of my invention resides in providing an engine crank case and lubricating system which are compactly associated in a single structure.

Other objects of the invention will appear from the following description taken in connection with the drawings forming a part of this specification, in which:

Fig. 1 is a medial vertical sectional view of a radial type of engine embodying the present invention;

Fig. 2 is a sectional view of the same taken on line 2—2 of Fig. 1;

Fig. 3 is a sectional view taken on line 3—3 of Fig. 1 illustrating the lubricant impelling pump;

Fig. 4 is a sectional view of the pump casing taken on line 4—4 of Fig. 1;

Fig. 5 is a sectional view of the pump mechanism, taken on line 5—5 of Fig. 1, in which the lubricant suction pump is shown, and Fig. 6 is a sectional view of the pump structure taken on line 6—6 of Fig. 4 and showing both the impeller and suction pumps.

Referring to the drawings, 10 represents an engine casing which is preferably cylindrical in form and adapted to have a plurality of radially extending cylinders 11 associated therewith. I have illustrated nine cylinders extending into the casing through equally spaced apertures, the cylinders being each provided with shoulders 12 arranged to seat against flat surfaces formed on the casing. A pair of band members 13 encircle the cylinder shoulders and secure the cylinders to the casing, a turnbuckle 14 being associated with threaded ends of each band to contract the bands and create a high compression around the casing.

It is one of my purposes to associate the lubricant reservoir adjacent the crank case and thereby eliminate the necessity for conduits and fittings, so to this end I provide a partition, or wall 15, which divides the casing into a crank case compartment 16 and a lubricant reservoir compartment 17. The partition isolates the two compartments relatively, and further is preferably arranged in the same plane with one of the bands 13, thereby reinforcing the casing interiorly in the plane of compression. This arrangement of the casing assists in the provision of a compact and light structure capable of withstanding high compression in the cylinders. A wall 18 is removably attached to the interior of the casing and is arranged parallel with the partition and preferably in the same plane with a compression band, such wall and the partition, together with the casing defining a closed crank case compartment. An annular bearing member 9 extends axially through the reservoir from the partition wall and supports one end of the crank shaft 19, while the other end of the crank shaft extends through the wall 18 which is formed with a central bearing. A removable plate 20 is secured by studs 21 to an interior casing shoulder and in parallel relation with the partition, and such plate together with the partition and the casing therebetween form a closed lubricant reservoir. The lubricant reservoir and crank case compartment are arranged side by side and extend entirely across the interior of the casing.

Pistons are arranged to be reciprocated within the cylinders, and are connected with the crank shaft through rods and a yoke 22. A master rod 23 is formed integral with the yoke and extends to the upper piston, while link rods 24 extend from the remaining pistons and are pivotally attached to pins 25 secured in spaced circular relation around the yoke. The crank extends through the yoke and is operated by the rods in the usual manner. Counterweighted cheeks 26 extend from the crank shaft in planes on either side of the yoke, while bushings of a conventional type are provided around the crank shaft at their place of support by the partition extension and the removable wall.

Propelling means for circulating the lubricant between the reservoir and the crank case is arranged preferably within the reservoir, and includes an impelling pump and a suction pump associated as a unitary structure. The pump structure includes a pair of casing members 27 and 28 between which is arranged a partition 29, and screws 30 are provided to secure the partition and casing members together. The casing member 27 houses the lubricant impelling meshing gears 31 and 32, while the casing member 28 houses the meshing gears 33 and 34 for returning lubricant from the crank case compartment to the reservoir. The gears 31 and 33 are keyed to a spindle 35 which projects through the partition 15 from the crank case and terminates therein in a gear disk 36. The casing 28 is provided with a bearing portion 37 which extends through an opening in the partition and receives the spindle 35. The end of the spindle extends through the pump casings and is threaded at its projecting end for the reception of the nut 38 which also assists in maintaining the proper arrangement of the pump elements. The gears 32 and 34 are mounted upon a common shaft 39 which extends through the casing members and is retained therein in parallel relation with the spindle 35. The screws 30 secure the pump elements together and such unitary structure is removably secured to the partition 15 by studs 40 and the nuts 41.

The pump structure is arranged beneath the crank shaft and in such position that it will be submerged in lubricant, the quantity of lubricant being such that its level is above the plane of the crank shaft extending through the partition bearing. With such arrangement, the lubricant circulating means is entirely submerged in the oil which is contained within the reservoir. Suitable means, such as the ring gear 42, is secured to the crank shaft in mesh with the gear 36, and rotation of the crank shaft will cause the meshing pump gears to rotate within their respective housings. A passage 43 leads from the lubricant reservoir to the chamber in which the gears 31 and 32 are housed, and rotation of the gears will draw lubricant through such passage directly from the reservoir.

Duct means is arranged entirely within the partition to provide passages for the circulation of lubricant between the reservoir and the crank case. A passage 44 leads from the impelling gears, in the pump housing, to the passage 45 which extends entirely within the partition 15 and opens into a groove 46 extending around the bushing 47. An aperture 48 extending through the grooved portion of the bushing communicates with a passage 49 extending through the crank shaft and into the hollow central portion thereof. Passages in the shaft lead from the hollow portion to other bearings and connections of the crank and associated parts within the casing, the pump exerting sufficient pressure on the lubricant to circulate it through such passages to all desired points.

The partition 15 is utilized to contain means for relieving excessive pressure of the lubricant beyond the impeller pump, and also as means for supplying oil to the reservoir. To this end a duct 50 is provided in the partition extending from the bushing groove 46 to the exterior of the casing, and a passage 51 leads from the duct 50 into the reservoir. A restriction is provided in the duct, below the passage 51, and forms a seat 52 for a spring pressed valve member 53, such valve member normally closing the passageway from the groove to the reservoir. When the lubricant pressure builds up beyond the predetermined spring pressure against the valve, the valve will be unseated, thereby establishing communication between the pump and the reservoir, and relieving the excessive pressure. The valve is provided with an opening 8 through which lubricant, poured into the duct 50 from the exterior of the casing, will flow into the passage 51 and the reservoir for filling or replenishing purposes. A closure cap 7 is screwed into the casing to close the duct 50, and a coil spring 6 extends between the cap and valve.

Lubricant escaping into the crank case compartment will be caught by a sump 54, from which is slotted tube 55 projects and is pressed into a passage 56 leading to a duct 57 in the partition 15. The duct 57 leads to the suction pump casing 28, and a passage 58 therein leads from the duct to the gears, while a passage 59 leads from the gears to a duct 60 in the partition 15 which communicates with the reservoir, but above the oil level therein. Thus the lubricant is moved from the sump into the reservoir, and substantially no oil will collect in the sump. A thermometer 61 is fitted to extend into the duct 57 so that the temperature of the oil in the system can be conveniently observed.

It will be seen that the crank case and lubricant reservoir are compactly associated in the engine casing, and that the lubricant circulation is entirely within the casing. The ducts in the partition 15 and the arrangement of the pump therewith serve to eliminate the use of conduits and fittings. With the herein described construction, circulation of oil, without danger of leakage and broken conduits, is provided for, and ease of starting in cold temperatures is facilitated because of the submerged arrangement of the pumps and the location of the lubricant system entirely within the casing whereby a much lower viscosity of the oil results.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In an engine, a crank case, a partition separating said casing into compartments, shaft bearing means formed with said partition and extending through one of the compartments, a hollow crank shaft extending through the bearing, said bearing and partition being formed with the passage through which lubricant is conducted from one of the compartments to the interior of the crank case, and pump means associated with the partition for moving the lubricant from the compartment through the passage in the partition and bearing.

2. In an engine, a casing, and a partition separating compartments in said casing, said partition being provided with duct means extending from the exterior of said casing to one of said compartments.

3. In an engine, a casing including a partition defining a lubricant reservoir, lubricant circulating means including ducts in said partition establishing communication between said reservoir and another portion of said casing, and means by which entrained lubricant leaving the reservoir will return thereto without circulating in another portion of said casing.

4. In an engine, a crank case including a partition defining an isolated lubricant reservoir, said partition having ducts therein through which lubricant is circulated between the reservoir and another portion of the case, pump means for circulating lubricant through the ducts, and pressure relieving means in the partition connected with the ducts for conducting circulated lubricant therefrom directly back into the reservoir.

5. In an engine, a crank case including a partition defining an isolated lubricant reservoir, passages in said partition for circulating lubricant between said reservoir and another portion of said case, duct means in said partition connected to return excess lubricant in the lubricant circulating passages into the reservoir, and valve means associated with said duct means.

6. In an engine, an annular casing, a transversely extending wall in said casing separating a lubricant reservoir from a crank case, a sump in said crank case, a crank shaft extending through the wall having a lubricant duct therein, duct means extending through said wall for connecting the reservoir with said sump and with the duct in said crank shaft, and pump means in the reservoir associated with said duct means for delivering lubricant from the sump to said reservoir and from said reservoir to the duct in the crank shaft.

7. In an engine, a casing, a partition in said casing separating a lubricant reservoir from a crank case, a pump in the reservoir secured to said partition, a removable cover forming one wall of the reservoir, and a screen surrounding said pump, said screen being supported by said partition and said removable wall.

8. In a radial internal combustion engine, a crank case, an interior wall in the crank case separating a lubricant reservoir from moving engine parts, said wall having passages extending radially and transversely therein through which oil leaves and enters the reservoir, and pumps in the reservoir for positively feeding oil through the passages in the wall.

9. In a radial internal combustion engine, a crank case, an interior wall in the crank case providing isolated lubricant reservoir and connecting rod compartments, a hollow crank shaft extending axially through the interior wall, said wall having an outlet passage communicating with the interior of the hollow crank shaft, a pump for moving lubricant from the reservoir through the wall passage, and means returning oil from the connecting rod compartment to the reservoir compartment.

10. In a radial internal combustion engine, a crank case, an interior wall in the crank case providing isolated lubricant reservoir and connecting rod compartments, said wall having passages extending partly radially therein providing a portion of the lubricating circuit and the sole inlet and outlet for the reservoir, and pump means for moving lubricant into and out of the reservoir through the passages in the wall.

11. In a radial internal combustion engine, a barrel crank case, an inner wall dividing the crank case into two axially aligned compartments of similar dimensions, one of said compartments forming a lubricant reservoir, said wall having inlet and outlet passages extending partly in a radial direction and communicating with the reservoir to form part of the lubricant circuit, and pumps associated with the wall and passages therein for moving lubricant through the circuit.

12. In a radial internal combustion engine, a crank case, an inner wall isolating a portion of the crank case to form a lubricant reservoir, duct means extending from the exterior of the crank case and through a portion of the inner wall for filling the reservoir, and means for circulating lubricant to and from the reservoir through the inner wall.

13. In an internal combustion engine, a crank case, an inner wall isolating a portion of the crank case to form a lubricant reservoir, said wall having lubricant passages leading therethrough to and from the reservoir, a common duct means in the wall through which oil flows into the reservoir from the outlet passage and during filling and pump means for circulating oil through the passages in the wall.

14. In a radial internal combustion engine, a barrel type casing, a wall extending entirely across the interior of the casing and transversely of its axis, said wall dividing the casing into separate aligned compartments of similar cross section, one of the compartments forming a lubricant storage reservoir of large capacity and the other of said compartments forming the crank case, a crank shaft extending through said interior wall and having a lubricant passage therein, said interior wall having a return passage leading from the crank case compartment into the storage compartment and a feeding passage leading from the storage compartment and communicating with the passage in the crank shaft, and pump means for moving lubricant from the reservoir through the wall passages into the crank case passage and through the wall return passage.

In testimony whereof I affix my signature.

LIONEL M. WOOLSON.